Sept. 28, 1965 T. A. JEEVES 3,209,160

INFORMATION-DIRECTIONAL LOGIC ELEMENT

Filed Nov. 28, 1960 2 Sheets-Sheet 1

WITNESSES:

Leon M. Garman

James F. Young

INVENTOR

Terry A. Jeeves

BY Ernest P. Klipfel

ATTORNEY

Sept. 28, 1965 T. A. JEEVES 3,209,160

INFORMATION-DIRECTIONAL LOGIC ELEMENT

Filed Nov. 28, 1960 2 Sheets-Sheet 2

United States Patent Office 3,209,160

Patented Sept. 28, 1965

3,209,160

INFORMATION-DIRECTIONAL LOGIC ELEMENT

Terry A. Jeeves, Penn Hills, Pa., assignor to Westinghouse Electric Corporation, East Pittsburgh, Pa., a corporation of Pennsylvania Filed Nov. 28, 1960, Ser. No. 71,996
10 Claims. (Cl. 307—88.5)

The present invention relates generally to logic elements and more particularly relates to an electrical circuit constructed of tunnel diodes and having information-directional properties of a unidirectional system.

The advent of a semiconductor device exhibiting a negative resistance region in the first quadrant of the current-voltage characteristic curve due to quantum mechanical tunneling has led to new logic element applications. Such a semiconductor device will hereinafter be referred to as a tunnel diode although it is to be understood that any suitable type of device having similar characteristics may be utilized.

One such device is as shown and claimed in the copending application Serial No. 853,863, filed November 18, 1959, now abandoned, by Herbert W. Henkels, and assigned to the same assignee as the present application. The device therein described comprises a first region of semiconductor material having a first-type of semiconductivity, a second region of semiconductive material of a second-type of semiconductivity disposed upon one surface of said first region, a narrow abrupt p-n junction being formed between the first and the second regions, and electrical leads connected to each region.

By applying a bias voltage to a tunnel diode and additionally connecting input and output terminals thereto, basic logic building blocks can be constructed. The tunnel diode is incapable of distinguishing a bonafide input from a spurious or false input resulting from a back circuit. Input terminals and output terminals to a tunnel diode are functionally equivalent. That is, a signal of any terminal, either input or output, may be sufficient to cause a signal to appear at all other terminals. Hence, the coupling of several stages in a logic net requires back circuit protection. The present invention provides such protection by means of a unidirectional circuit hereinafter referred to as a pseudo diode.

Conventional logic nets without back circuit protection require a high speed power supply clock to drive the various stages of the net sequentially. A prior element is turned off and another element turned on and so forth as the information proceeds through the net. Note that the use of a high-speed phased-clock to drive the elements sequentially does not of itself eliimnate the basic "back-circuit" problem. Conventionally, this problem is overcome by using with the clock tunnel diode twin circuits, which lock-in.

These circuits use twice as many Esaki or tunnel diodes in an undesirable physical configuration, and require matched components. The physical configuration is undesirable from the point of view of ease of manufacture, cost, and distributed capacitance. Furthermore, even the highest speed clock available is relatively slow compared to the speed with which a tunnel diode may switch operating points.

Accordingly, an object of the present invention is to provide a unidirectional circuit utilizing tunnel diodes and capable of overcoming the inherent information-non-directional property of such a device.

Another object of the present invention is to provide a new and improved unidirectional circuit for passing information through a network such as a computer.

Another object of the present invention is to provide a unidirectional circuit making ultra high switching speeds, extreme reliability, and compactness available at low cost.

Another object of the present invention is to provide a unidirectional circuit capable of use in a logic net and eliminate the necessity of an ultra high speed power supply clock to prevent back circuits.

Another object of the present invention is to provide a unidirectional circuit using tunnel diodes and being completely compatible structurally with other tunnel diode circuits.

Another object of the present invention is to provide a unidirectional circuit which can be economically fabricated of dendritic material.

Further objects and advantages of the present invention will be readily apparent from the following detailed description taken in conjunction with the drawing, in which:

FIG. 8 is another logic net constructed in the prior art while

For purposes of clarity, the characteristic curve of a tunnel diode will be discussed with reference to FIGURE 1. For reverse bias, the resistance of the diode is small and decreases monotonically with increasing voltage. In the forward direction of voltage, V, across the tunnel diode, the current therethrough increases to a sharp maximum $I_p$ on a portion of the characteristic curve to be referred to as the low voltage side. Further increase in the voltage across the diode results in the negative resistance portion of the characteristic curve wherein the current through the diode drops to a deep and broad minimum, referred to as the valley current $I_v$. Still further increase in the voltage across the diode causes the current to increase again on a portion of the characteristic curve to be referred to as the high voltage side to a maximum value, $I_h$ determined by the maximum voltage $V_h$ appearing across the diode as determined by the circuit parameters of the logic element incorporating the tunnel diode. The break over current level as determined by the peak tunneling current $I_p$ may be referred to as the threshold or excitation level of the diode. For the purposes of this specification, the term tunnel diode is meant to include all devices exhibiting the aforementioned characteristics.

The basic logic elements constructable from tunnel diodes are multi-input threshold circuits. The simplest useful circuits of this type are diagrammatically and symbolically illustrated in FIGURES 1 and 2. These circuits are the minimum needed to perform logical functions.

Figure 1:
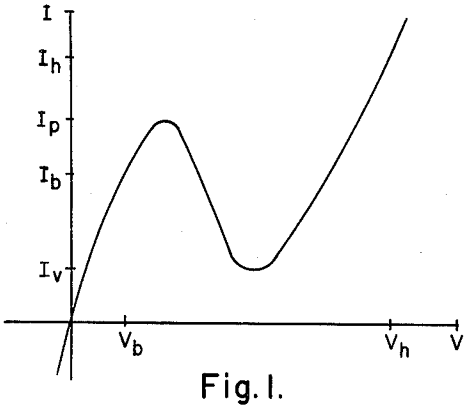
FIGURES 1 through 5 illustrate basic logic elements, and their symbolic representation, utilized in the present invention.
Figure 1A:
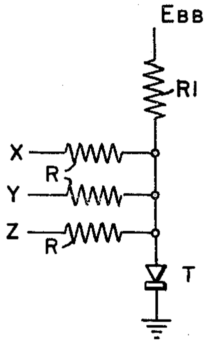
Figure 2:
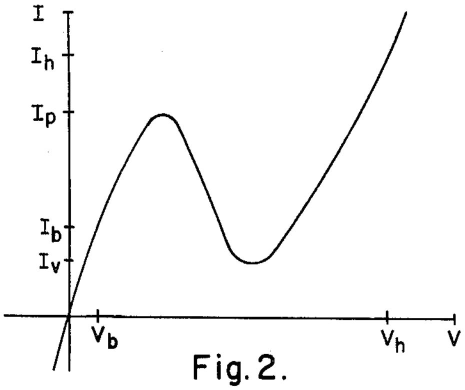

Referring to FIGURE 1A, a tunnel diode T, having one side connected to a reference or ground potential and the opposite side connected to a biasing potential $E_{BB}$ through a biasing resistor R1, has connected at the junction of the biasing resistor R1 and the diode T, three input terminals X, Y and Z through current limiting input resistors R respectively. By selection of the biasing resistor R1 a voltage $V_b$ will be caused to appear across the diode T in the forward direction so that a biasing current $I_b$ flows therethrough. It is to be noted that no distinction is made between input and output terminals since all of the terminals with regard to FIGURES 1 and 2, are functionally equivalent. This behavior contrasts markedly to that of conventional vacuum tube and transistor circuits which are insensitive to signals applied to output terminals. It is to be understood that threshold circuits with more than three terminals may be used where desirable and even permit more economical circuits to be manufactured, but additional terminals do not alter the basic logical problems as herein discussed.

Figure 1B:
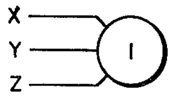

Considering a biasing current $I_b$ through the tunnel diode T it can be seen that by the addition of signal current through the diode as a result of an input signal to any of the terminals X, Y or Z of sufficient magnitude to allow the sum total of current flow through the diode to exceed the peak tunneling current $I_p$ that the break over will result with the diode switching to the high voltage side of the characteristic curve and thereby increasing the voltage thereacross to a value $V_h$. The magnitude of input signal sufficient to provide current through the diode to cause break over upon the appearance of a signal at one terminal only is herein referred to as a one unit input and the break over level of a diode having a characteristic curve as illustrated in FIGURE 1 is hereafter referred to as a one unit input threshold level diode. Symbolically, a one unit input level diode is chosen to be represented as shown in FIGURE 1B with the numeral 1 indicating that a one unit input will cause the diode to switch its operating point from the low voltage side to the high voltage side of the characteristic curve.

Figure 2A:
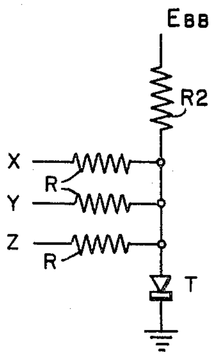
Figure 2B:
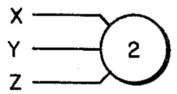

The operating characteristics of a two unit input threshold level diode is illustrated in FIGURE 2. FIGURE 2A is a diagrammatical illustration of such a device wherein like elements are designated with identical reference characters used in FIGURE 1A. In FIGURE 2A a biasing resistor R2 is selected so that a voltage $V_b$ appears across the diode T resulting in a bias curve $I_b$ which presets the diode to an operating point on the low voltage side of the characteristic curve requiring a two unit input signal to exceed the break over current level of the diode. Such a device is symbolically illustrated in FIGURE 2B wherein the numeral 2 represents the necessity of a two unit input signal to cause the diode to switch operating states.

The two circuits illustrated are the minimum needed to perform logical functions. In a one unit input threshold level element the presence of a signal at any terminal is sufficient to excite or fire the element and to cause a signal to appear at all the other terminals. In a two unit input threshold level element, the presence of a signal at any pair of terminals is sufficient to excite or fire the element and to cause a signal to appear at the remaining terminal.

Figure 3:
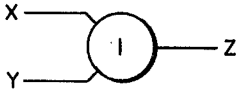
Figure 4:
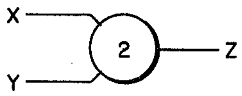

The three terminal circuits of FIGURES 1 and 2 are sufficient to form a complete basis for logical system. FIGURE 3 illustrates a one unit input element capable of performing the logic OR function wherein Z is X or Y. FIGURE 4 symbolically illustrates a two unit input device capable of performing the logic AND function; that is, Z is X and Y. If the complement of every initial input signal is available, these two elements as illustrated in FIGURES 3 and 4 will suffice to construct any desired output signal and its complement.

Figure 5:
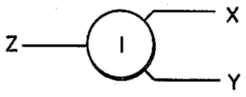

The OR and AND circuits of FIGURES 3 and 4 have only one output terminal. To permit a given output signal to be applied to several different inputs in a succeeding stage a FAN-OUT circuit as illustrated in FIGURE 5 may be used. The FAN-OUT circuit obviates the necessity for heavy duty drivers on the inputs of a logical net constructed of tunnel diodes. Through the use of a FAN-OUT function, additional input-output terminals can be added to the basic OR function at the expense of an additional threshold element for each additional terminal. Therefore, one input signal can have multiple outputs responsive to the one input signal. Parallel circuits are not required. Additionally, an input is not required for each output. Hence the heavy duty drivers are not required.

Figure 6:
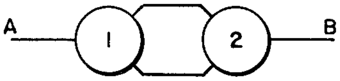
FIGS. 6, 6A and 6B is an illustrative embodiment of the present invention.

In accordance with the present invention a unidirectional circuit, constructed of tunnel diodes and having information-directional properties is shown in FIGURE 6. This circuit, referred to as a pseudo diode circuit, solves a major problem, namely, how to obtain an information-directional property from an inherently non-directional element as the tunnel diode. The symbolic representation of such a unidirectional circuit is as shown in FIGURE 6. Its realization is obtained through threshold elements previously described. A one unit input element and a two unit input element are directly interconnected to prevent back circuits. An input signal applied at terminal A will cause an output to appear at terminal B. The input signal at terminal A will excite the one unit element, which, through the double connection to the two unit element, will have sufficient power to fire the two unit input element and cause a signal to appear at the output terminal B. On the other hand, a spurious signal applied at the output terminal B will not cause a signal to appear at the input terminal A. Such a signal at the output terminal B will be incapable of causing break over of the two unit input element if its magnitude is less than a two unit input signal. Assuming a one unit spurious signal at the output terminal, which will be the usual case in a logical network net, the spurious signal cannot excite the two unit input level element. Consequently the one unit input level element is prevented from firing and no signal appears at the input terminal A.

Figure 6A:
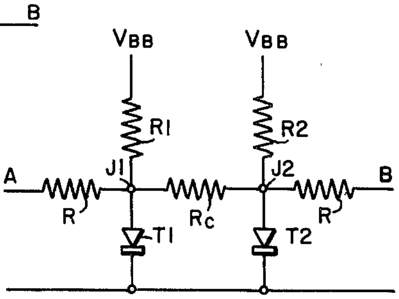

FIGURE 6A illustrates an electrical schematic diagram of such a unidirectional circuit wherein the tunnel diode T1 has a voltage appearing thereacross through selection of the biasing resistor R1 which is sufficient to make the first tunnel diode section element a one unit input element. The second tunnel diode T2 has a voltage appearing thereacross as determined by the biasing resistor R2 so as to form a two unit input element as previously discussed with connection to FIGURE 2. An input terminal A is connected to the junction J1 between the biasing resistor R1 and the tunnel diode T1 through an input resistor R. An output terminal B is connected to the junction J2 between the biasing resistor R2 and the tunnel diode T2 through an output resistor also designated as R. (This output resistor may actually be an input resistor of another logic element.) Interconnecting the junctions J1 and J2 is a coupling resistor R*c* which is chosen to have an impedance value of sufficient magnitude to block a spurious input appearing at the output terminal B from causing break over of the tunnel diode T1. Additionally the coupling resistor R*c* is selected to have a minimum impedance magnitude capable of allowing current flow through the second tunnel diode T2 equivalent to at least a two unit input signal to the junction J2 resulting from the bias supply connected to the biasing resistor R1 upon break over of the tunnel diode T1 when an input signal of one unit magnitude appears at the terminal A.

It is to be recalled that the threshold elements previously described were referred as three terminal elements. The pseudo diode illustrated in FIGURE 6A may be considered to be made up of two such three terminal elements, the connecting resistor R*c* having an impedance value one-half the impedance of the terminal resistors R. Hence, the connecting resistor R*c* may be considered to be made up of two impedances each of magnitude equivalent to the terminal resistor R and the total impedance presented by the connecting resistor R*c* is, for example, one-half such resistance.

The unidirectional circuit may be used to protect against back circuits in control circuitry other than a tunnel diode logic net. The maximum spurious signal which the pseudo diode is capable of blocking is a spurious signal having a magnitude slightly lesss than a two unit input signal and thus be insufficient to cause break over of the tunnel diode T2. To provide blocking of a spurious signal of such magnitude and still allow the forward sequential progression of information from the input terminal A to the output terminal B, it can be shown that the coupling resistor Rc will have a maximum value and minimum value $$R_{c\ min.}=\frac{V_{T2h_{max.}}-V_{T1b_{min.}}}{I_{T1p_{min.}}-I_{T1b_{max.}}}$$

and $$R_{c\ max.}=\frac{V_{T1h_{min.}}-V_{T2b_{max.}}}{I_{T2p_{max.}}-I_{T2b_{min.}}}$$

As determined by the characteristic curve of the tunnel diodes T1 and T2 shown in FIGURES 1 and 2 respectively; the subscripts T1 and T2 referring to the value of that particular diode, and:

$V_{h_{max}}$ is the maximum voltage that can develop across a diode when it is in the high voltage state;

$V_{h_{min}}$ is the minimum voltage that can develop across a diode when it is in the high voltage state;

$V_{b_{min}}$ is the minimum voltage that can develop across a diode when it is biased in the low voltage state;

$V_{b_{max}}$ is the maximum voltage that can develop across a diode when it is biased in the low-voltage state;

$I_{p_{max}}$ is the maximum peak excitation current of a diode;

$I_{b_{max}}$ is the maximum bias current through a diode when it is in the low voltage state;

$I_{b_{min}}$ is the minimum bias current through a diode when it is in the low voltage state.

The inclusion of maximum and minimum in the equations indicating worst case conditions.

Figure 6B:
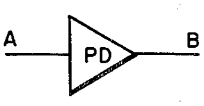

For purposes of clarity the unilateral circuit has been assigned a symbolic representation as shown in FIGURE 6B wherein the input terminal and output terminals A and B respectively are shown along with a pseudo diode $P_D$. It is to be understood that such a symbolic representation is to be used for the circuitry shown in FIGURE 6A.

Figure 7:
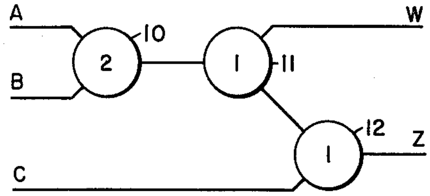
FIG. 7 illustrates a logic net as might be constructed by the prior art.
Figure 8:
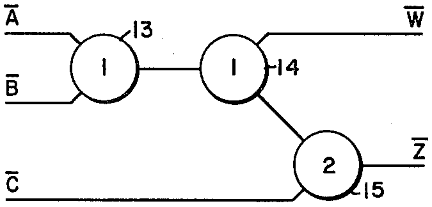

A simple example or two of the use of pseudo diodes is illustrated in FIGURES 7 and 8. FIGURE 7 illustrates a random selection of fundamental operations that may be desirable and is connected in a logic net of the prior art. Logic element 10 is a two unit input threshold level device or AND circuit. Element 11 performs the fan-out function. Element 12 is a one unit input threshold level element or OR circuit. Input terminals A, B and C are connected as shown. Output terminals W and Z serve as the output means of the logical net. The output W is to be equal to A and B. The output Z is to be equal to W or C. FIGURE 7 illustrates one manner in which a back circuit can appear. The connection between elements 11 and 12 causes an output signal to appear at the terminal W whenever there is an input signal on the input terminal C. This spurious signal causes improper operation of the circuit. It can be seen that element 11 provides an output W which is considered to be identified with A and B. However, input C would cause a sneak input to the device 11 to thereby identify it with C or (A and B), so as to cause an erroneous output W. This is so since element 12 is a single input level device.

Figure 7A:
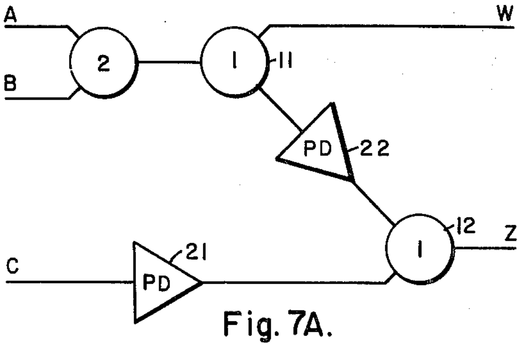
FIG. 7A is an illustrative embodiment of the present invention in such a logic net of the prior art.

FIGURE 7A illustrates the back circuit protection provided by pseudo diodes of the present invention. The positioning of a pseudo diode 21 between the input terminal C and the element 12 and a pseudo diode 22 between the element 11 and 12 provides back circuit protection. Pseudo diode 22 protects the element 11 from a spurious signal. Pseudo diode 21 separates the input signal C and the signal from the element 11 to the element 12 so that separate identification of each may be had.

FIGURE 8 illustrates another logic net of the prior art. Element 13 is a one unit input threshold level device performing as an OR circuit. Element 14 is a one unit input threshold level device performing the FAN-OUT function. Element 15 is a two unit input level threshold device performing an AND function. It can be seen that if the logic net shown in FIGURE 8 is part of a larger network a potential source of trouble is the element 13. The element 13 causes the two input signals $\bar{A}$ and $\bar{B}$ to be identical. This identification can have deleterious effects on the operation of the other parts of the net which follow. An input to element 14 from element 15 will result in an input to element 13. This input in combination with the complement of A or the complement of B appearing at the input terminals $\bar{A}$ or $\bar{B}$ will cause the other to become identical. In a larger network, the fact that the complement of A and B may be caused to become identical through a spurious signal can cause deleterious effects on the operation of other parts of the network.

Figure 8A:
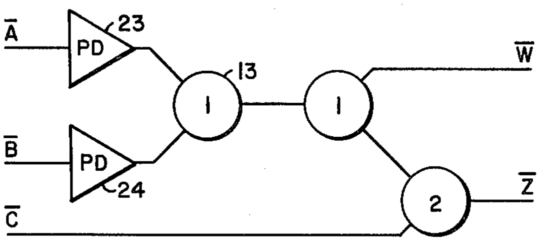
FIG. 8A is an illustrative embodiment of the present invention in such a logic net of the prior art.

FIGURE 8A provides a solution to this problem through the present invention. Pseudo diodes 23 and 24 are connected between the input terminals $\bar{A}$ and $\bar{B}$ respectively to the element 13. Hence, upon appearance of a spurious signal to the element 13 from the element 14 the complement of A or B will not be caused to become identical through a spurious signal coinciding at the other input terminal.

It is to be noted with reference to FIGURE 6A that the pseudo configuration has a common base structure as the threshold elements. Such a reference base is highly important in the economics of manufacture of a pseudo diode. The circuit shown makes practical high speed logic circuits which can be fabricated on dendritic material having a common base layer. All tunnel diode elements of the pseudo diode circuit shown in FIG. 8A can be placed on the same base layer. The result is an extremely compact miniature circuit at very low cost.

While this invention has been described with a particular degree of exactness for the purposes of illustration, it is to be understood that all equivalents, alterations, and modifications with the spirit and scope of the present invention are herein meant to be included. For instance, when desirable the resistance elements R shown in FIGURE 6A may be replaced by diodes. However, ordinary diodes may well be too slow for the desired results. Backward diodes may also be used but they are not as readily suited to dendritic fabrication and their tendency to introduce undesirable capacitance in the unidirectional or pseudo diode circuit will further inhibit the fast operational switching which the tunnel diodes provide.

Thus, it is readly apparent that the present invention overcomes the inherent and non-directional information properties of the tunnel diode. Informational-directional flow through a logic net can be obtained without the use of an expensive ultra high speed power supply clock. The pseudo diode protects against back circuits and hence a high speed clock is not necessary. Further, the very high speed switching of tunnel diodes is fully exploited through the use of pseudo diodes in any logic net. While the present invention has been illustrated with reference to its application in logic nets, it is readily apparent that wherever a unidirectional circuit is required, capable of distinguishing between input signals and spurious output signals and capable of protecting from back circuit signals, the pseudo diode of FIGURE 6A may be used.

I claim as my invention:

1. A unidirectional device comprising, in combination; a first tunnel diode having an input threshold level which is exceeded when a one unit input signal is applied thereto and a second tunnel diode having a threshold level which is exceeded when a two unit input signal is applied thereto; input means operably connected to said first tunnel diode; output means operably connected to said second tunnel diode; and impedance means operably connecting said first tunnel diode and said second tunnel diode; said impedance means having sufficient impedance to block a spurious signal at said output means to avoid breakover of said first tunnel diode but insufficient impedance to block breakover of said second tunnel diode upon breakover of said first tunnel diode.

2. A unidirectional circuit comprising in combination a first tunnel diode and a second tunnel diode, said diodes having different threshold values; input means connected to said diode having the lesser threshold level, output means connected to said other diode; impedance means connecting said first and second diode in electrical circuit relationship; said impedance means allowing greater current between said first and second diode than through either the input means or the output means upon breakover of either diode.

3. The unidirectional circuit of claim 2 in which the magnitude of said current allowed between said first and second diode is selected to be sufficient to exceed the threshold level of one diode when the threshold level of the other diode is exceeded by a signal at said other diode.

4. A unidirectional circuit comprising, in combination; a first tunnel diode and a second tunnel diode; each tunnel diode having at least three terminal connections; means for biasing said first diode to have a one unit input threshold level; means for biasing said second diode to have a two unit input threshold level; two of said three terminals of said first diode connected to two of said three terminals of said second diode and adapted to have an impedance of sufficient magnitude to block said first diode from a spurious input of a magnitude less than a two unit input signal at the third terminal connection of said second diode.

5. The unidirectional circuit of claim 4 including means for biasing said first diode sufficiently to cause the threshold of said second diode to be exceeded upon breakover of said first diode.

6. A unidirectional circuit comprising, in combination; a first tunnel diode and a second tunnel diode; each tunnel diode having an anode and a cathode; said cathodes connected in a common circuit relationship; means for biasing said first tunnel diode to a threshold value which can be exceeded by a one unit input signal; means for biasing said second tunnel diode to a threshold value capable of being exceeded by a two unit input signal; input means connected to the anode of said first tunnel diode; output means connected to the anode of said second tunnel diode; interconnecting means for connecting said first anode and said second anode in electrical circuit relationship, said interconnecting means having an impedance substantially less than either said input means or said output means.

7. A unidirectional circuit comprising, in combination; a first tunnel diode and a second tunnel diode; said second tunnel diode having a threshold value of magnitude twice as large as the threshold value of said first tunnel diode; input impedance means connected to said first tunnel diode; output impedance means connected to said second tunnel diode; interconnecting means operably connected between said first and second tunnel diode having an impedance substantially one half the impedance of said input impedance means or said output impedance means.

8. A unidirectional circuit comprising, in combination; a first tunnel diode and a second tunnel diode; voltage means operably connected to said first tunnel diode for biasing said first tunnel diode whereby a single unit input to said first tunnel diode will result in its breakover; voltage means operably connected to said second tunnel diode biasing said second tunnel diode whereby at least a two unit input signal is required to cause its breakover; input means operably connected to said first tunnel diode; output means operably connected to said second tunnel diode; and interconnecting means between said first tunnel diode and said second tunnel diode having an impedance sufficient to reduce the voltage appearing across said first tunnel diode resulting from a spurious signal of one unit magnitude at the output means to a magnitude of voltage across said first tunnel diode which is less than the magnitude of voltage across said first tunnel diode upon occurrence of a single unit input at said input means.

9. A unidirectional circuit comprising at least two stages; each stage comprising a tunnel diode and means for selectively biasing said diode to predetermined threshold voltage levels; input means and output means operably connected to the first and the last stage respectively; interconnecting means between said stages; said interconnecting means so constructed and arranged that substantially more current flows therethrough than allowed through either the input or the output means for a given signal; alternate successive stages being biased to a one unit threshold voltage level; the intermediate stages being biased to a two unit input threshold voltage level.

10. An electrical system comprising, a plurality of tunnel diode stages; each stage comprising a tunnel diode and means for selectively biasing said diode; pseudo diode means operably connected between selected stages; each pseudo diode comprising a first tunnel diode section and a second tunnel diode section so constructed and arranged that said second tunnel diode section has a threshold voltage level exceeding the threshold voltage level of said first tunnel diode section; each of said plurality of tunnel diode stages having an output sufficient to exceed the threshold voltage level of a first tunnel diode section only; and impedance interconnecting means between the sections of said first and second tunnel diodes having an impedance sufficient to block a spurious signal to said second diode section should the spurious signal be insufficient to cause breakover of said second diode but of sufficient magnitude to normally cause breakover of said first diode.

References Cited by the Examiner

UNITED STATES PATENTS

| | | | |
|---|---|---|---|
| 3,075,088 | 1/63 | Li | 307—88.5 |
| 3,078,376 | 2/63 | Lewin | 307—88.5 |

OTHER REFERENCES

1960 International Solid-State Circuit Conference, First Edition, February 1960, "The Tunnel Diode as a Logic Element," Lewin et al.

ROY LAKE, *Primary Examiner.*

GEORGE N. WESTBY, *Examiner.*